Patented Mar. 4, 1947

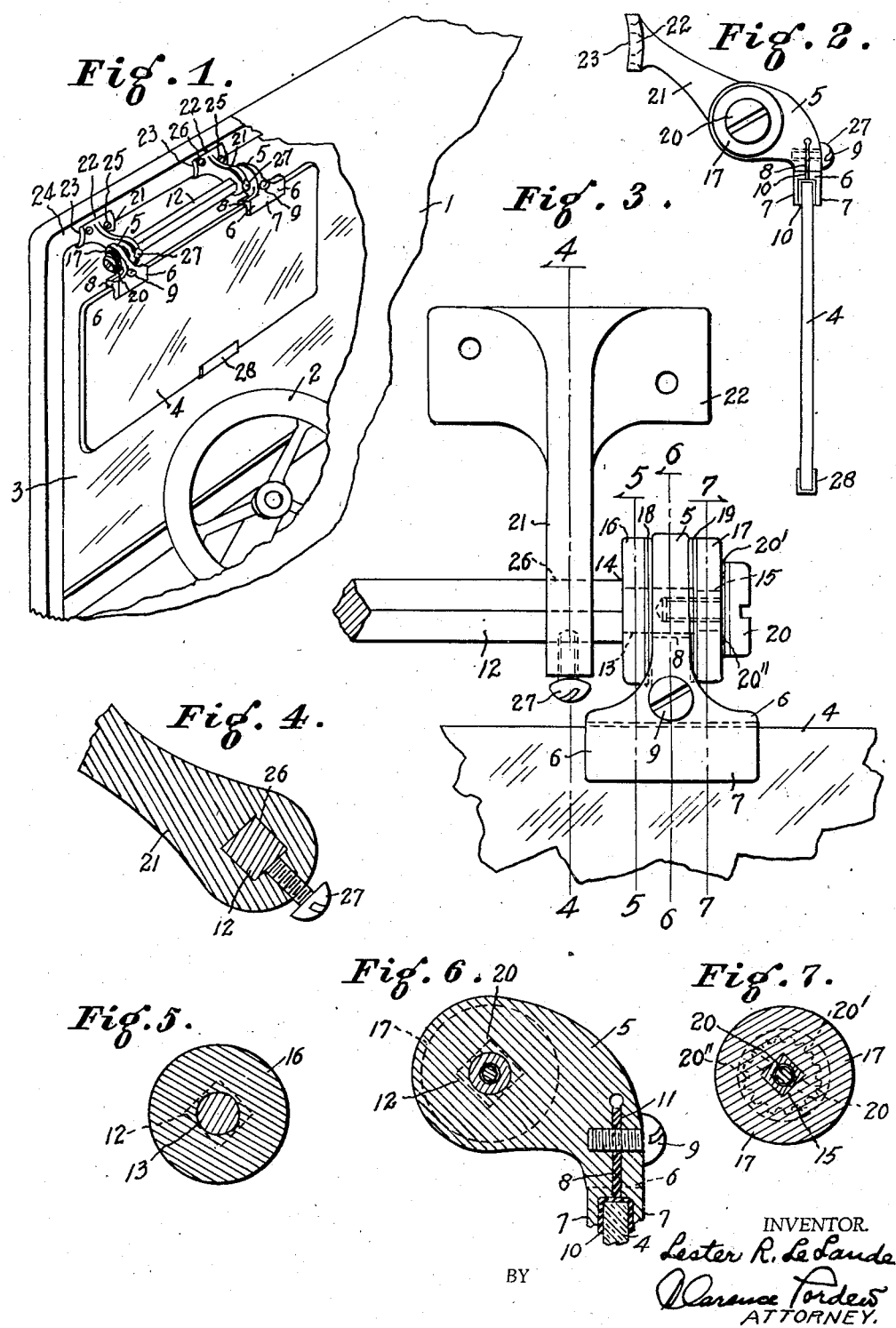

2,416,761

UNITED STATES PATENT OFFICE 2,416,761

GLARE SHIELD

Lester R. Le Lande, Pasadena, Tex.

Application January 19, 1944, Serial No. 518,824

2 Claims. (Cl. 296—97)

My invention relates to devices used on motor vehicles to subdue the glare of light from other sources, for the driver of the vehicle provided with the device; and more particularly to such devices of the kind in which there is interposed between the driver's eyes and the place of approach of vehicles having the glaring lights, a transparent member having, by its color or tint, the property of subduing the glare. Such member usually is mounted between the driver and the windshield of his vehicle; and should, for efficiency and convenience, be adjustable to have various postures, depending upon the disposition of the vehicle parts, and also upon the posture and propensity of the driver. Such adjustment also depends upon the location of the glare that is to be subdued; for instance, in day time, the device may be used to subdue the glare of the sunlight instead of to subdue the glare of approaching vehicle lights at night.

Such devices or shields have been mounted in various ways upon the windshield, or upon the stationary frame thereof, or other adjacent parts of the vehicle. I disclose and claim in my copending application, Serial No. 420,995, filed November 29, 1941, and now abandoned, a glare shield more readily adapted for mounting and use on light motor vehicles, such as passenger cars. My present invention is more adapted for mounting and use on heavy motor vehicles such as trucks, buses and the like, whereon the jars are more severe, so that a firmer mounting is required, yet provides for ready adjustment for the reasons above noted. The invention of my copending application just mentioned has a single mounting bracket, so that the mounting of the shield is not likely to meet with interference by parts of the vehicle equipment. On such heavier vehicles, however, I have found that a shield provided with more than one mounting bracket, for making it more resistant to the heavy jars of such vehicles, at least one of the brackets, if the brackets are provided only for single locations, as in my prior Patent No. 1,546,739, issued July 21, 1925, in many cases encounters the above mentioned interference with a part of the motor vehicle.

Also, in my prior patent just mentioned, each mounting bracket connects to the shield member proper by means of a ratchet device, for adjustment. In my copending application above mentioned, the single bracket has the ratchet device; but there being but one bracket and one ratchet device, the invention therein is a simplification of the invention of the patent. In the present invention, requiring two brackets, I have avoided the use of ratchet devices by employing a simple gripping device; so that my present invention is a simplification of my prior patent invention as well as an improvement over that of my copending application in its better adaptability for use on vehicles where it incurs severe jars which a single bracket would not so successfully resist, where the bracket is connected to the vehicle. In both the copending application and in the present case, the connection of the bracket part to the shield member proper, are substantially the same, as such connections in a pair are ample to hold the shield member under the more severe jars of the heavier vehicles.

The objects of my invention therefore are to provide an especially efficient mounting for a glare shield member; to permit such a mounting to be adapted for connection to a vehicle without interference of vehicle parts; to maintain an efficient connection of the mounting to the shield member proper; and to provide a simplified structure for adjustment of posture of the shield, permitting a pair of mountings to be employed without unduly complicating and increasing the expense of production of the glare shield as a whole. I attain these objects by the device illustrated, for example, in the accompanying drawing, in which:

Figure 1 is a perspective view of the forward part of a motor vehicle, understood to be truck or the like, as indicated by the vertical disposition of the glass or windshield front most frequently found on such vehicles;

Fig. 2 is a side elevation of the glare shield adjusted to its vertical position of the shield member shown in Fig. 1;

Fig. 3 is an elevation, looking from the driver's position, of a part of the shield member proper and one of the mounting devices or brackets, with the rod that would connect to the other mounting or bracket broken away;

Fig. 4 is a partial front-to-rear vertical section on the plane of the line 4—4 of Fig. 3;

Fig. 5 is a like section on the plane of the line 5—5 of Fig. 3;

Fig. 6 is a like section on the plane of the line 6—6 of Fig. 3; and

Fig. 7 is a like section on the plane of the line 7—7 of Fig. 3.

In Fig. 1 is shown a front fragment of the vehicle 1, with its steering wheel 2 shown in its relation to one side part of the glass or windshield front 3 of the vehicle, between which front 3 and the driver's position at the steering wheel 2 is interposed the glare shield member proper 4, which will be understood to be of transparent material, preferably very clear plate glass. Such glass or other transparent shield member in practice is colored or tinted; the color or tint being such as to allow clear vision yet subdue the glare. A preferred color is a shade of blue that meets these requirements and also does not alter the traffic light colors, usually red, amber and green, as seen by the driver through the shield member.

Attached to the upper edge of shield member 4 are ears 5 that extend upwardly and forwardly. Each ear has its bottom formed with lateral extensions 6 with depending sides 7 forming a continuous inverted-U or channel which straddles the shield member upper edge. From the top of the channel, as best seen in Figs. 3 and 6, a slit 8 is formed, extending upwardly and throughout the length of the base of the ear 5. A clamp screw 9 extends loosely through the rear portion of the base, across the slit and into the front portion, into which it is threaded. By this screw 9 the portions may be drawn toward each other to clamp the edge part of the shield member. So that the channel sides 7, thus drawn, will hold the shield member firmly, yet not break it, an inverted-U shaped piece of cushion material 10 is fitted into the channel astraddle of the shield member edge. Also, to limit the drawing of the channel sides 7 toward each other so far as to make breakage of the shield member liable, a strip of cushion material 11 is inserted in the slit 8 with screw 9 passing through it. Such cushion mounting is described and claimed in my copending application above mentioned.

Extending from one ear 5 to the other, parallel with the upper edge of the shield member 4 and into the respective ears, is a bar 12, which for the major distance between ears 5 is of square cross section. Extending from the ends of the square portion of bar 12 are respective cylindrical portions 13, concentric with the square portion, leaving shoulders 14 around them at the ends of the square portion. Succeeding each cylindrical portion 13 and concentric with it is a reduced square portion 15. Next to the shoulder 14 at each end, between it and the respective ear 5 is a relatively thick washer 16, having a circular opening; the ear 5 also having a circular opening, and these circular washer and ear openings receiving snugly the cylindrical portion 13 of the bar 12 at the respective end. A washer 17, similar to the washer 16, except that it has a square opening, has this square opening receiving snugly the respective reduced square portion 15 of bar 12. Between each of the washers 16 and 17 and the respective side of the ear 5 are thin washers or discs 18 and 19 respectively, of material that sets up effective friction between discs and between discs and the washers and ear 5. The ends of bar 12 have concentric tapped holes in them, and end screws 20 thread into the respective tapped holes with relatively large heads at the outer sides of the respective square-holed washers 17. Interposed between each one of these screw heads, of the screws 20, is a lock washer 20' of suitable type, the one preferred being best indicated in the dotted lines of Fig. 7, resembling an internal-toothed gear with the teeth 20'' pressed out to indentingly engage the adjacent side of the respective square-holed washer 17 as may be seen in Fig. 3.

A pair of brackets 21 are provided for attachment to a convenient part of the motor vehicle 1. As shown in Fig. 1 they are attached to the top rail of the glass or windshield front structure of the vehicle. Each bracket 21 has a base 22 with portions extending laterally from both sides of the bracket body, and being continuous with each other and preferably having a concave bottom 23 as best seen in Fig. 2. This bottom 23 will fit snugly the face of the upper rail 24 of the windshield structure 3 if this face is convex in cross section. It may be variably positioned around the concave face so that the bracket extends at various angles as may be necessary due to parts of the vehicle adjacent to rail 24 and above the brackets. Or, if the rail 24 has a flat face, the straight edges of the concave base 22 will fit such a face. This provision of a glare shield bracket with a concave bottom also is disclosed and claimed in my before mentioned copending application. As shown, the brackets 21 are so shaped and so postured relative to their bases 22 that when the bases are secured to the vehicle part, as the rail 24 in Fig. 1, they slant rearwardly and downwardly. Their ear-shaped rear end parts have through them respective square holes 26; and their bases are secured to rail 24 by two screws 25 in each base 22. The square bar 12, before described, has its square middle major portion snugly fitting through the square holes 26 in the brackets 21, which have respective set screws 27 to clamp a bracket 21 anywhere along this major square part of bar 12.

No obstructive part of the vehicle 1 is shown in Fig. 1, and so the brackets 21 are shown each very close to a respective ear 5 and its associated parts before described, as most clearly seen in Fig. 3. Were there an obstructive part, so that either bracket 21, or obstructive parts so that neither bracket 21, could be located in the positions along the windshield top rail 24 as seen in Fig. 1, the obstructed bracket could be slid along the square bar 12 to a position where it could set properly against rail 24. This setting of course is done by loosening the set screws 27 of the brackets, loosening them from bar 12, then sliding the brackets to the permissible locations along the top rail 24, upon which the brackets 21 may be attached to the rail 24 by the screws 25 and the set screws 27 may be tightened to hold the square bar 12 at the desired location in which it can hold the glare shield member 4 in the proper working position before the vehicle driver.

On the bottom edge of the glare shield member 4 is a small channel member 28 straddling the edge and fitting tightly on the shield member, to serve as a finger hold avoiding finger marks on the shield member 4. To set the shield member 4 at any desired inclination, either vertical as shown or swung rearwardly in its dependence from the bar 12 and brackets 21, the operator simply grasps the shield at the channel member 28 and swings it. This swinging is resisted by the clamping pressure exerted by the screws 20 at each end of bar 12 on the washers and the interposed discs 18 and 19; the screw being set at the required tightness at each end upon installing the device as above described. The bar 12 cannot turn in the brackets, and the shield proper swings on the cylindrical parts 13 of bar 12. Outward washer 17 cannot turn on bar 12 as it fits on reduced square part 15 of bar 12 and forms a non-rotative body for gripping the clamp screw 20 stationary, maintaining the friction of the mounting, due to the action of lockwasher 20' with its teeth 20" against the outer side of washer 17.

It is found that the combination with the screws 20 and the washers 16 and 17, with the interposed friction discs 18 and 19, with the screws 20 properly tightened, holds the windshield member 4 very firmly against the severe jars of the heavy vehicles for which the device is especially adapted. Of course, upon wear of the frictional parts, as the discs 18 and 19, the wear may be taken up and the firm holding renewed simply by tightening the clamp screws 20. These are preferably provided with kerfs in their heads as shown, to receive a screw-driver as a most convenient tool.

Of course such heads may be shaped for a wrench; and other parts may be subject to modifications without departing from the scope of my invention which is defined in the following claims.

I claim:

1. A combination including a glare shield member, a plurality of ear elements fixed to said member, a corresponding plurality of bracket elements adapted to be fixed to a part of a vehicle, means pivotally connecting said ear elements to said bracket elements and comprising cylindrical portions, the ear elements having respective circular openings in which the cylindrical portions fit, and said pivotally connecting means comprising angular portions, clamping elements having respective angular openings in which said angular portions fit, and means for drawing said clamping elements into tight frictional holding relation to the respective ear elements, said pivotally connecting construction having an intermediate length of angular cross section and the brackets having respective openings angularly shaped, in which the intermediate length fits, thereby permitting adjustment of the bracket elements to various locations along said intermediate length accordingly as the bracket elements are to be attached to a vehicle part at various locations thereon, but holding said intermediate part and the brackets relatively non-rotatable.

2. A combination including a glare shield member, a plurality of ear elements fixed to said member, a corresponding plurality of bracket elements adapted to be fixed to a part of a vehicle, means pivotally connecting said ear elements to said bracket elements and comprising cylindrical portions, the ear elements having respective circular openings in which the cylindrical portions fit, and said pivotally connecting means for one of the ears, at least, comprising an angular portion, a clamping element having an angular opening in which said angular portion fits, and means for drawing said clamping element into tight frictional holding relation to the ear element, said pivotally connecting construction having an intermediate length of angular cross section and the brackets having respective openings angularly shaped, in which the intermediate length fits, thereby permitting adjustment of the bracket elements to various locations along said intermediate length accordingly as the bracket elements are to be attached to a vehicle part at various locations thereon, but holding said intermediate part and the brackets relatively non-rotatable.

LESTER R. LE LANDE.

REFERENCES CITED

The following references are of record in the file of this patent:

UNITED STATES PATENTS

| Number | Name | Date |
|---|---|---|
| 1,461,289 | Primrose | July 10, 1923 |
| 1,546,739 | Le Lande | July 21, 1925 |
| 1,421,467 | Harden | July 4, 1922 |
| 1,445,918 | Sterling | Feb. 20, 1923 |
| 1,465,374 | Stetler | Aug. 21, 1923 |
| 1,473,185 | Jacobs | Nov. 6, 1923 |
| 1,567,480 | Wood | Dec. 29, 1925 |
| 1,933,333 | Morgan | Oct. 31, 1933 |
| 2,153,095 | McKinley | Apr. 4, 1939 |
| 2,236,710 | Hocking | Apr. 1, 1941 |
| 2,279,648 | Westrope | Apr. 14, 1942 |